Oct. 3, 1967 B. EK 3,345,012

TAPE REEL HOLDER FOR TAPE REELING DEVICES

Filed June 24, 1966 3 Sheets-Sheet 1

INVENTOR.
BIRGER EK
BY
Darby and Darby
ATTORNEYS

INVENTOR.
BIRGER EK
BY
Darby and Darby
ATTORNEYS

Oct. 3, 1967 B. EK 3,345,012

TAPE REEL HOLDER FOR TAPE REELING DEVICES

Filed June 24, 1966 3 Sheets-Sheet 3

INVENTOR.
BIRGER EK

BY

Darby and Darby
ATTORNEYS

United States Patent Office 3,345,012

Patented Oct. 3, 1967

3,345,012

TAPE REEL HOLDER FOR TAPE REELING DEVICES

Birger Ek, Sundbyberg, Sweden, assignor to Facit AB, Atvidaberg, Sweden, a Swedish joint-stock company Filed June 24, 1966, Ser. No. 560,251
Claims priority, application Sweden, July 22, 1965, 9,701/65
6 Claims. (Cl. 242—68.3)

ABSTRACT OF THE DISCLOSURE

There is disclosed herein a holder for reels of tape such as punched paper tape or magnetic tape, particularly as used in data processing machines, which holder is so constructed that the tape reels may be easily and rapidly mounted on the holder or hub for drive by the latter. The holder disclosed is further usable with tapes of varying widths and avoids the use of elements such as knives, which tend to destroy the reels and cause possible harm to an operator.

The present invention relates to a tape reel holder for tape reeling devices, preferably intended for reeling punched paper tapes and similar data processing media.

Punched paper tapes are normally delivered in the form of rolls wound on a reel or spool of cardboard or plastic. Also when used in data processing centres and the like the tapes are wound on such reels. In all types of data processing and data transmitting equipments it is of great importance that the reels may very quickly mounted on and removed from the tape reel holders in various tape units and tape reeling devices. As the reels may have different inner measurements, depending on the make and, moreover, the manufacturing tolerances of the reels normally are great, the holders must be made with an adjustable diameter. A known type of such reel holder has an expanding hub which is adjusted by means of a screw. This device ensures an excellent securing of the reel, but the exchange of reels takes too much time. In another known reel holder spring-loaded knives are provided on the holder which cut into the reel and prevent it from slipping on the holder. This type of reel holder permits a rapid mounting and dismounting of the tape reels, but the knives will easily destroy the reel, particularly when starting with a full reel. Furthermore, there is a risk of the operating staff hurting their fingers on the knives at unintentional start. The tape reel holder according to the invention has all the good features of the first mentioned expanding reel holder, and at the same time affords an extremely rapid handling. It also permits varying the width of the reels within wide limits.

Figure 1:
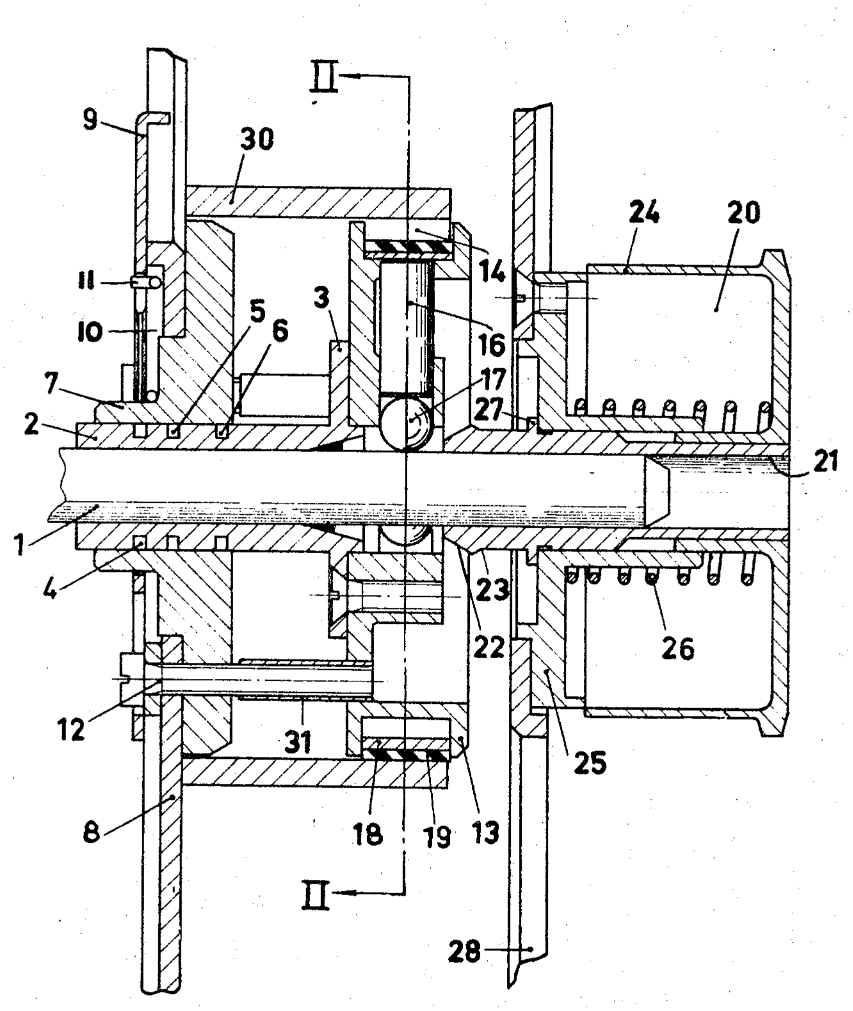
Figure 2:
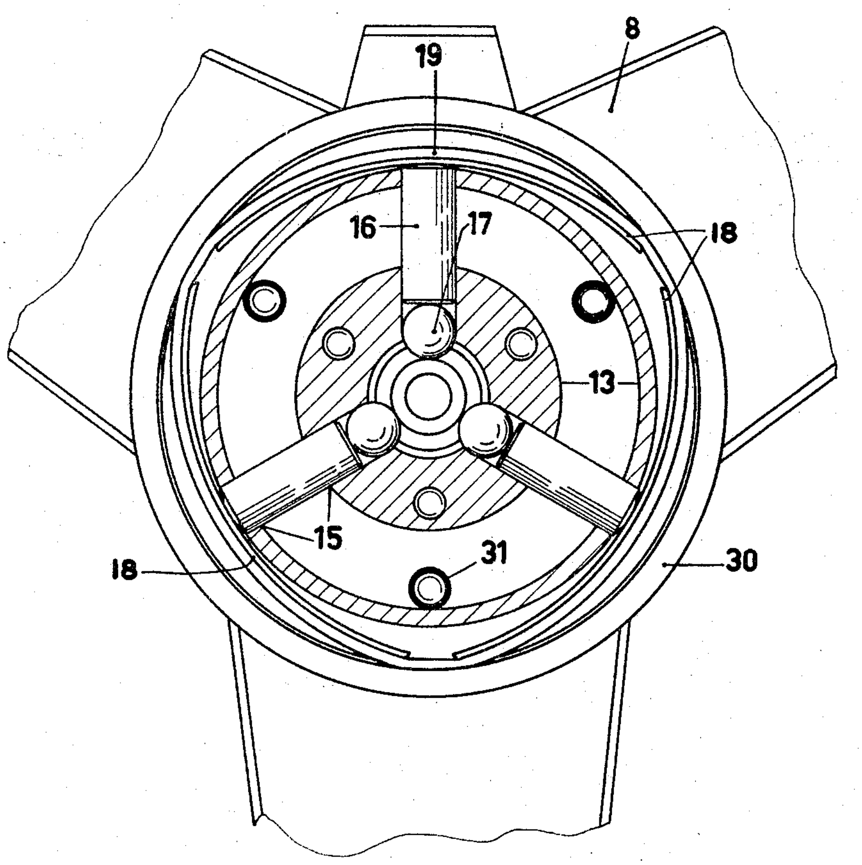
Figure 3:
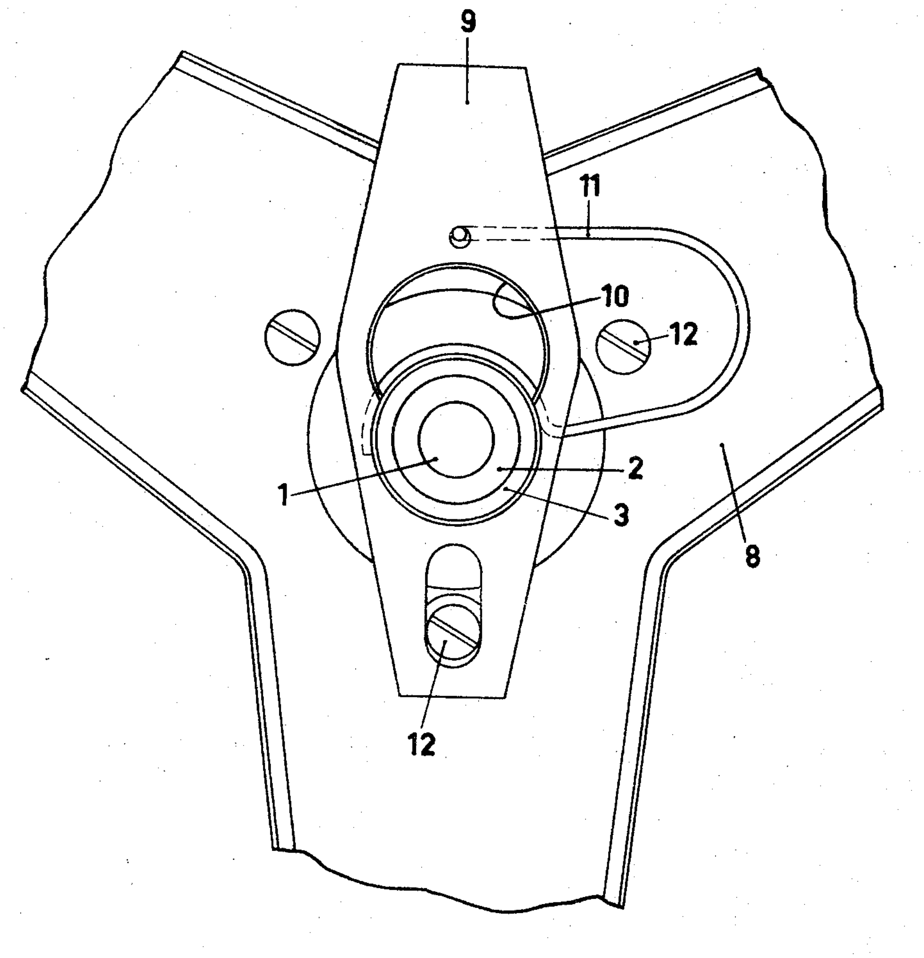

The invention will be more fully described with reference to the accompanying drawings, in which FIG. 1 shows a section view in an axial plane. FIG. 2 shows a radial section view on the line II—II in FIG. 1, and FIG. 3 shows an end view as seen from the left in FIG. 1.

In the drawings numeral 1 designates the shaft of the tape reel holder which is coupled to driving means, not shown. To the shaft 1 there is fixed a sleeve 2 which is provided with a flange 3 and three groove 4, 5 and 6. On the sleeve 2 there is slidably mounted a hub 7 for an end plate 8 which is secured to the hub 7 by means of screws 12. A catch 9 having a keyhole shaped aperture 10 (FIG. 3) is mounted in a groove in the hub 7, the rims of the lower narrower part of said aperture fitting into the grooves 4, 5 or 6 of the sleeve 2. These grooves correspond to various widths of the tapes to be placed on the tape reel holder. The spring 11 strives to pull the catch 9 upwards so that the narrow part of the aperture 10 engages the selected groove, for example 4, as shown in FIG. 1.

The screws 12 have such length that they extend through the hub 7, that part which extends beyond the hub being provided with a sleeve 31 which fits into a corresponding hole in a ring 13. The sleeved screws serve to guide the hub 7 during its axial movement and prevent the latter from turning around the sleeve 2 during the rotation of the tape reel holder.

To the flange of the sleeve 2 there is fixed the ring 13, in the circumference of which there is shaped a groove 14. The ring is provided with three radial bores 15 in which cylindrical pins 16 are slidably mounted. That end of the pins which faces the shaft 1 abuts a ball 17 located between the shaft and the pin and guided by the bore 15. The outer end of each pin is fixed to a curved leaf spring 18, each of which covers a little less than a third of the circumference of the ring 13. The width of the springs 18 is such as to make them fit into the groove 14, and their radius of curvature is greater than the greatest radius of the ring 13. When the pins 16 are in their innermost position the free ends of the leaf springs are approximately located in the circumference of the ring. A ring 19 of rubber or a similar resilient material with a relatively great friction coefficient is applied around the springs 18.

The tape reel holder has a detachable end piece 20, which is slid on to the shaft 1. The end piece comprises a sleeve 21, one end of which has a conical portion 22 ending with an annular shoulder 23. The sleeve is rigidly connected with a grip 24. On the sleeve and the inner portion of the grip there is slidably mounted a hub 25, and a spring 26, which bears against the end face of the grip 24, urges the hub 25 against a collar 27 on the sleeve 21. An end plate 28 of the same kind as the end plate 8 is screwed on to the hub 25.

The device operates in the following manner.

The left end plate 8 is first adjusted to the desired tape width by disengaging the catch 9 so that the hub 7 may be pushed to the desired position. The catch is released and allowed to enter the corresponding groove 4, 5 or 6. Thereafter the reel 30 is mounted with or without paper tape wound on it so that its inner surface rests on the circumference of the hub 7 and the ring 13. The end piece 20 is mounted on the shaft 1 and pressed against the reel 30. When the end plate 28 contacts the reel 30, at the same time as the grip 24 is submitted to an axial force, the spring 26 and the sleeve 21 are compressed, permitting the grip 24 to be pushed further on to the shaft. The conical portion 22 of the sleeve 21 lifts the balls 17, the pins 16 being then pressed outwards towards the circumference. The springs 18 are lifted correspondingly and their ends press the rubber ring 19 against the inner surface of the reel into frictional engagement with the same, thus preventing the reel from rotating relative to the tape reel holder. That part of the spring 18 which is fixed to the pin 16 is lifted only so much that the outer surface of the rubber ring will be approximately at a level with the circumference of the ring 13. When the sleeve 21 has been pushed far enough the ball snaps over the shoulder 23 and the end piece 20 is locked. The reel is now safely held by the friction force of the spring 18 and the rubber ring 19 and the end plate 28 being spring-loaded relative to the sleeve 21, the axial position of the end plate is accurately adjusted according to the width of the tape. The end piece 20 is released by pulling the grip 24, until the snap action of the balls 17 against the shoulder 23 is overcome.

What I claim is:

1. A holder for tape reels of the type having data processing tapes wound thereon, said holder comprising in combination, a shaft, a ring, means rigidly connecting said ring to said shaft for drive thereby, said ring serving as a hub for the reel, at least one leaf spring located at the circumference of said ring and having a radius of curvature which is greater than the radius of the outer circumference of the ring, a pin slidable in a radial bore in said ring, means securing said spring at its center to said pin, a second ring or resilient material extending about the circumference of the first ring and outside said leaf spring, said second ring maintaining said leaf spring in place and pressing the pin toward the center of said ring, a sleeve on said shaft, said sleeve terminating in a conical portion, said sleeve being axially displaceable on the shaft toward said ring, said conical termination serving as a cam to lift said pin to press the free ends of the spring aaginst the elastic ring and the latter against the inner surface of the reel.

2. A tape reel holder as claimed in claim 1, wherein said first ring includes an axially extending sleeve, an end plate mounted on and extending radially of said sleeve and cooperating means in said sleeve and end plate for adjusting said end plate to a desired position axially of said sleeve.

3. A holder for tape reels as claimed in claim 1, wherein said hub ring is provided with a circumferentially extending groove and wherein said leaf spring and said second ring lie entirely within said circumferential groove when said sleeve is disengaged from said pin.

4. A holder for tape reels as claimed in claim 3, wherein a ball is placed in said radial bore, radially inward of said pin, and adjacent said shaft.

5. A tape reel holder as claimed in claim 4, wherein said conical terminating portion of said sleeve joins said sleeve in an annular shoulder, said annular shoulder serving to hold said sleeve in its adjusted axial position when said ball moves beyond said conical portion and seats on said sleeve adjacent said shoulder.

6. A tape reel holder as claimed in claim 5, wherein an end plate for said tape is mounted on said sleeve, resilient means are provided urging said sleeve and said end plate axially apart whereby when said end plate seats against said first ring said sleeve is resiliently urged to press said ball against said shoulder.

References Cited

UNITED STATES PATENTS

| | | | |
|---|---|---|---|
| 3,124,319 | 3/1964 | Cohen et al. | 242—68.3 |
| 3,249,314 | 5/1966 | Kjos | 242—68.3 |

FRANK J. COHEN, *Primary Examiner.*

N. L. MINTZ, *Assistant Examiner.*